United States Patent
Sorge et al.

(10) Patent No.: US 7,769,036 B2
(45) Date of Patent: Aug. 3, 2010

(54) HARDWARE FUNCTIONAL PARTITIONING IN A SYSTEM PLATFORM OF A TELECOMMUNICATION NETWORK ELEMENT

(75) Inventors: Paolo Sorge, Carugate (IT); Silvio Cucchi, Gaggiano (IT); Stefano Gastaldello, Teolo (IT); Luca Razzetti, Sesto San Giovanni (IT)

(73) Assignee: Alcatel, Paris (FR)

( * ) Notice: Subject to any disclaimer, the term of this patent is extended or adjusted under 35 U.S.C. 154(b) by 1167 days.

(21) Appl. No.: 11/004,143

(22) Filed: Dec. 6, 2004

(65) Prior Publication Data
US 2005/0223190 A1    Oct. 6, 2005

(30) Foreign Application Priority Data
Apr. 5, 2004 (EP) .................... 04290903

(51) Int. Cl.
*H04L 12/56* (2006.01)
(52) U.S. Cl. .................. 370/419; 370/469; 370/474
(58) Field of Classification Search .......... 370/412–421
See application file for complete search history.

(56) References Cited

U.S. PATENT DOCUMENTS

| | | | |
|---|---|---|---|
| 6,011,802 A * | 1/2000 | Norman | 370/466 |
| 6,782,009 B1 * | 8/2004 | Giorgetta et al. | 370/539 |
| 6,892,336 B1 * | 5/2005 | Giorgetta et al. | 714/704 |
| 2003/0067655 A1 * | 4/2003 | Pedersen et al. | 359/152 |
| 2004/0008708 A1 | 1/2004 | Giacomini | |

OTHER PUBLICATIONS

ITU-T G.707/Y.1322 dated Dec. 2003, Network Node Interface for the Synchronous Digital Hierarch (SDH).
ITU-T G.783 dated Oct. 2000, Characteristics of Synchronous Digital Hierarchy (SDH) Equipment Functional Blocks.
ITU-T G.798 dated Jan. 2002, Characteristics of Optical Transport Network Hierarchy Equipment Functional Block.

* cited by examiner

*Primary Examiner*—Jayanti K Patel
*Assistant Examiner*—Bo Hui A. Zhu
(74) *Attorney, Agent, or Firm*—Sughrue Mion, PLLC

(57) ABSTRACT

Disclosed is a device and method for processing a frame including overhead and payload, the device comprising: a first hardware module for processing the payload, the payload processing comprising termination/adaptation and cross-connection functions; and a second hardware module for processing at least a part of overhead, wherein said second hardware module cooperates with the first hardware module for controlling the payload cross-connection and consequent actions.

11 Claims, 4 Drawing Sheets

HARDWARE FUNCTIONAL PARTITIONING IN A SYSTEM PLATFORM OF A TELECOMMUNICATION NETWORK ELEMENT

BACKGROUND OF THE INVENTION

1. Field of the Invention

The present invention relates to telecommunication network elements and in particular to a port framer in a system platform of such a network element. Furthermore, the present invention relates to a method for carrying out a functional partitioning in a system platform. This application is based on, and claims the benefit of, European Patent Application No. 04290903.6 filed on Apr. 5, 2004, which is incorporated by reference herein.

2. Description of the Prior Art

As it is known, a network element, for instance an ADM (Add/Drop Multiplexer) or a DXC (Digital Cross Connect) comprises one or more input ports, backpanel connections and one or more switching matrices. The ports receive input flows in the form of frames. Presently, the frames could be compliant with SDH, SONET, OTH, ITU-T G.707, G.783, G.709, G.798 Standards. The following description and claims will be referred to SDH Standard only for clarity reasons but this should not be deemed to be a limitation because the scope of the present invention is not limited to SDH.

As far as SDH is concerned, ITU-T G.783 specifies both the components and the methodology that should be used in order to specify SDH functionality of network elements. ITU-T G.783 specifies a library of basic building blocks and a set of rules by which they may be combined in order to describe a digital transmission equipment. The library comprises the functional building blocks needed to specify completely the generic functional structure of the Synchronous Digital Hierarchy. In order to be compliant with this Recommendation, equipment must be composed as an interconnection of a subset of these functional blocks contained within the Recommendation. The interconnections of these blocks should obey the combination rules given. The specification method is based on functional decomposition of the equipment into atomic, and compound functions. The description is generic and no particular physical partitioning of functions is implied.

Fundamentally, ITU-T G.798 specifies both the components and the methodology that should be used in order to specify OTH functionality of network elements.

The prior art devices for processing frames, with each frame comprising overhead and payload, comprise a single hardware module. The single hardware module processes both the payload and overhead by carrying out adaptation, termination and cross-connection functions. The hardware module according to the prior art is generally composed of an application-specific integrated circuit, ASIC, straightforward implementing the functional partitioning described by the above mentioned standards.

Advantageously, straight and literal implementation of Standards functional partitioning into a full ASIC system provides high integration features and high performances. Disadvantageously, ASIC devices do not provide flexibility on Standard evolution and on system requirements. In other words, when a reference Standard becomes changed or there is the need to change the system requirements, an ASIC device is unable to follow such changes.

Providing the whole Standard functional partitioning features into an ASIC device results in a highly risky implementation due to the ASIC slow turnaround for silicon respin delay, which comprises full layout and fab activities and high NRE (Non-Recurring-Engineering) cost, which mostly includes the mask cost. It is known that an ASIC device is not flexible in providing support to different Standards in the same device area with the same cost; on the contrary, different Standards supported in the same ASIC require more silicon area and raises costs for all applications. Furthermore, an application-specific integrated circuit does not match fastest time-to-market requirement due to slow and complex verification (based on simulation) of a full-featured ASIC. This results in a later ASIC availability for system integration.

SUMMARY OF THE INVENTION

In view of the above problems and disadvantages, the main object of the present invention is providing a device and method for carrying out a profitable functional partitioning in a system platform implementing a more flexible SDH-SONET-OTH platform.

In particular, an object of the present invention is providing higher flexibility on Standard evolution and on system requirements.

A further object is providing a device that can be made and designed with a lower design error risk with respect to existing ASIC's and thus reducing overall costs, virtually avoiding ASIC silicon respin.

A still further object is providing a device better complying with reduced time to market periods, targeting in the first system release a basic subset of fundamental features, in order to match market timeframe, but keeping the possibility to evolve to a full featured system without any kind of restriction.

Applicant has addressed the above problems and has realized that a possible solution would be in splitting the payload processing from overhead processing.

In fact, the payload needs a large bandwidth and highly integrated and fast technology but its processing (especially alignment and matrix switching) is well established and is not subject to Standard evolution.

On the other hand, the overhead processing is much more complicated than the payload one. Particularly complicated are the steps of Automatic Protection, Alarm Reporting and Performance Monitoring. It is also known that overhead features could become changed during the time because of Standard changes. There are chances that first releases of new framers could fail because of an incorrect processing of overhead. In any case, overhead needs a more reduced bandwidth than payload.

The above and further problems and disadvantages are solved by a device according to claim 1 and a method according to claim 4. Further advantageous features are set forth in the dependent claims. All the claims are deemed to be an integral part of the present description.

In view of the above, according to a first aspect, the present invention provides a device for processing a frame including overhead and payload, the device comprising:
  a first hardware module for processing the payload, the payload processing comprising termination/adaptation and cross-connection functions; and
  a second hardware module for processing at least a part of overhead, wherein said second hardware module cooperates with the first hardware module for controlling the payload cross-connection and maintenance signalling (e.g. AIS indications).

Preferably, said second hardware module performs one or more of overhead adaptation, termination and cross-connection functions.

According to a profitable embodiment, the first hardware module comprises an application-specific integrated circuit (ASIC) and the second hardware module comprises a field programmable gate array (FPGA).

According to a second aspect, the present invention provides a method for processing a frame including overhead and payload, the method comprising:

processing the payload by a first hardware module, the payload processing step comprising terminating/adapting and cross-connecting; and processing at least a part of overhead by a second separate hardware module, wherein said second hardware module cooperates with the first hardware module for controlling the payload cross-connection and maintenance signalling (e.g. AIS indications).

Preferably, the step of processing at least a part of overhead by said second hardware module comprises performing one or more of overhead adaptation, termination and cross-connection functions.

According to a profitable embodiment, the first hardware module comprises an application-specific integrated circuit (ASIC) and the second hardware module comprises a field programmable gate array (FPGA).

The present invention will become clear after reading the following detailed description, to be read with reference to the accompanying figures,

BEST MODE FOR CARRYING OUT THE INVENTION

Reference should be made to ITU-T G.783 and G.798 for a better comprehension of the present invention. Both the Recommendations are incorporated herewith as a reference.

Figure 1:
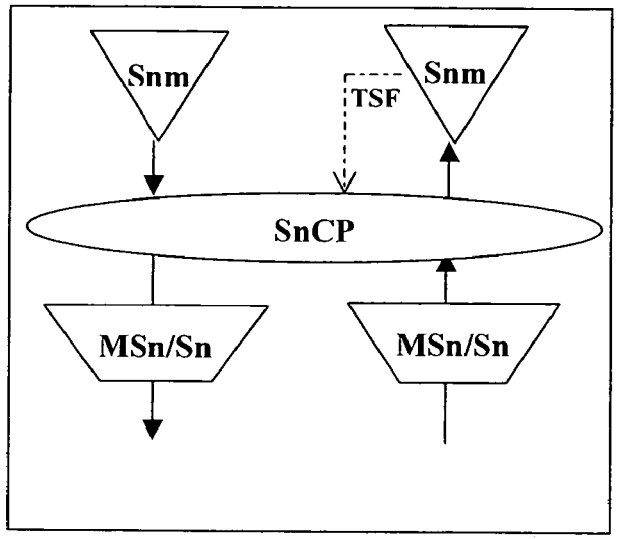
FIG. 1 diagrammatically shows a partitioning according to the state of the art, Standard compliant and single ASIC implemented.

FIG. 1 shows a schematic representation of a partitioning according to the state of the art. In particular, the shown partitioning is ITU-T G.783 compliant. The processing is commonly performed by a single ASIC. Only SnCP/Snm functional layer has been shown. Such a known solution results in all the problems and disadvantages set forth above.

As said above, the basic idea is to shift the Standard G.783/G.798 functional partitioning into a novel functional partitioning which splits Overhead Adaptation/Termination/Cross-connection from Payload Adaptation/Termination/Cross-connection with a coherent and systematic methodology. The resulting partitioning allows to map an architecture wherein all complex, high-risk, evolving Overhead functionalities are pushed into a separate second hardware module. According to a particularly advantageous embodiment, the second hardware module can be implemented in a FPGA. In the device according to the present invention, the high-speed/high-integration Payload handling and cross-connection functions are still implemented into a first hardware module comprising an ASIC.

Figure 2:
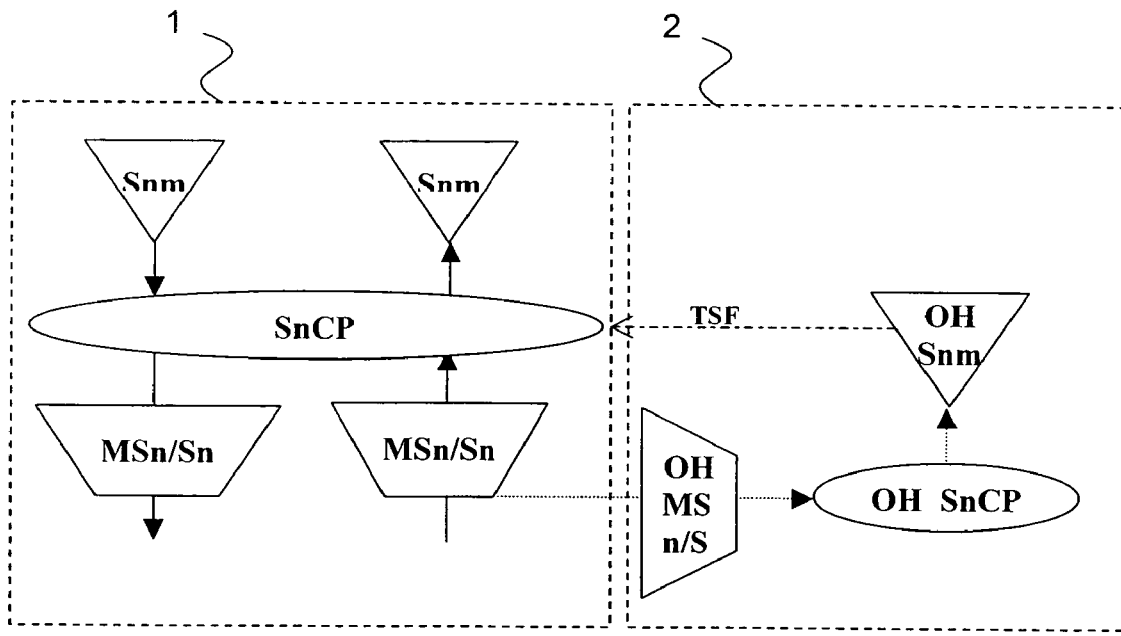
FIG. 2 diagrammatically shows a partitioning according to the present invention, still Standard compliant but implemented by two separate hardware modules.

A basic representation of the present invention is shown in FIG. 2. Although the present invention is applicable to any functional layer, a specific implementation is depicted in FIG. 2 for SDH SnCP/Snm.

From a comparison between FIGS. 1 and 2, it will become clear that in a state of the art functional partitioning, both overhead and payload first cross adaptation function (MSn/Sn), then Monitoring. In this stage, overhead is elaborated and its processing forces the matrix switch, performing Cross-connection function. On the contrary, the arrangement according to the present invention is based on an early functional split of overhead from Payload Adaptation/Termination/Cross-connection: overhead is extracted and separated from Payload at Adaptation, following a separate path through the system.

The separate overhead elaboration allows, for instance, the use of a FPGA for carrying out such an overhead elaboration. The separate overhead elaboration is possible due to a novel overhead synchronization methodology comprising the following steps: buffering the raw overhead on single significant byte basis and for each single tributary; elaborating such a buffered raw overhead on standard compliance, for defect process and correlation process; calculating the output Consequent Actions and the Protection commands, according to different Protection schemes.

Payload elaboration still follows a conventional path through the system, crossing Adaptation/Termination/Cross-connection. Payload Cross-connection is driven by overhead elaboration output.

The separate overhead elaboration results in a proper reduction of processing resources complying with the state of art single FPGA arrangements technology but still provide full compliance to Standard switch time.

Figure 3:
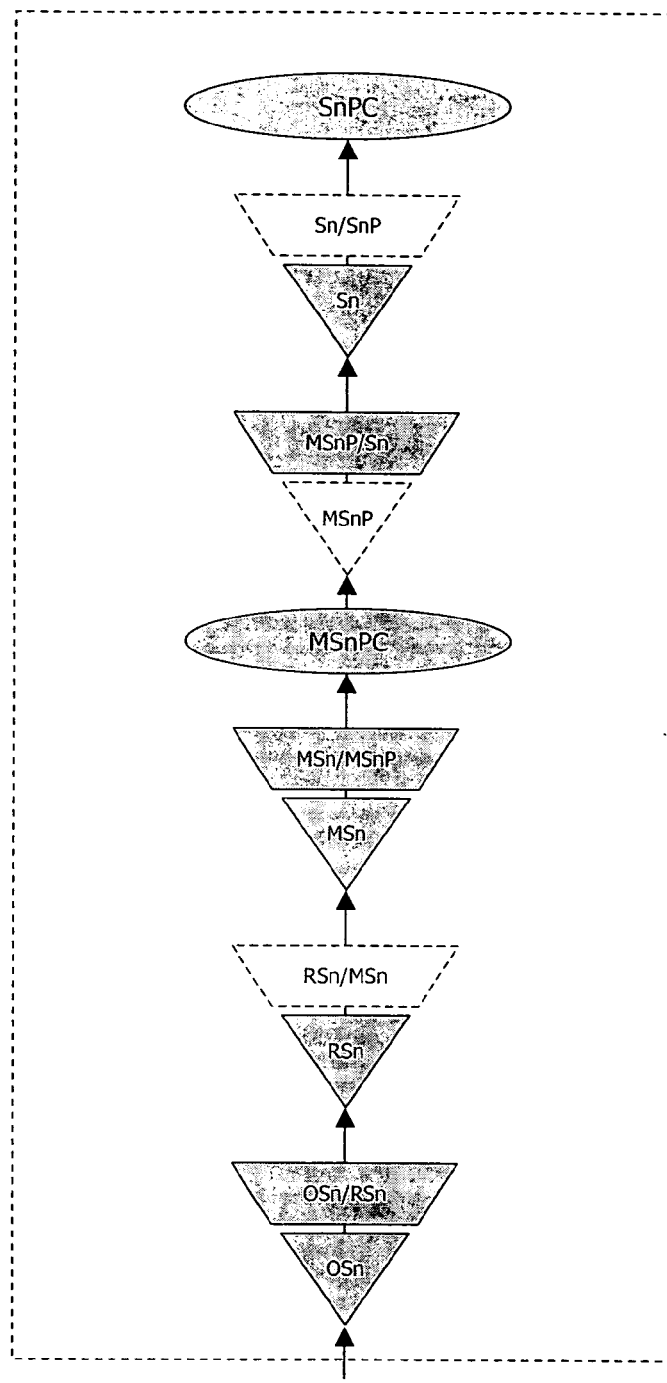
FIG. 3 shows a more detailed scheme of the partitioning according to the state of the art, Standard compliant and single ASIC implemented.

In FIG. 3 a more detailed model is shown. The model is fundamentally compliant with ITU-T G.783 10/2000. For clarity reasons, only sink functions are depicted. The degenerate functions are sketched in white whilst the effectively performed functions are in grey. No separation of operations made on payload and overhead is made.

Figure 4:
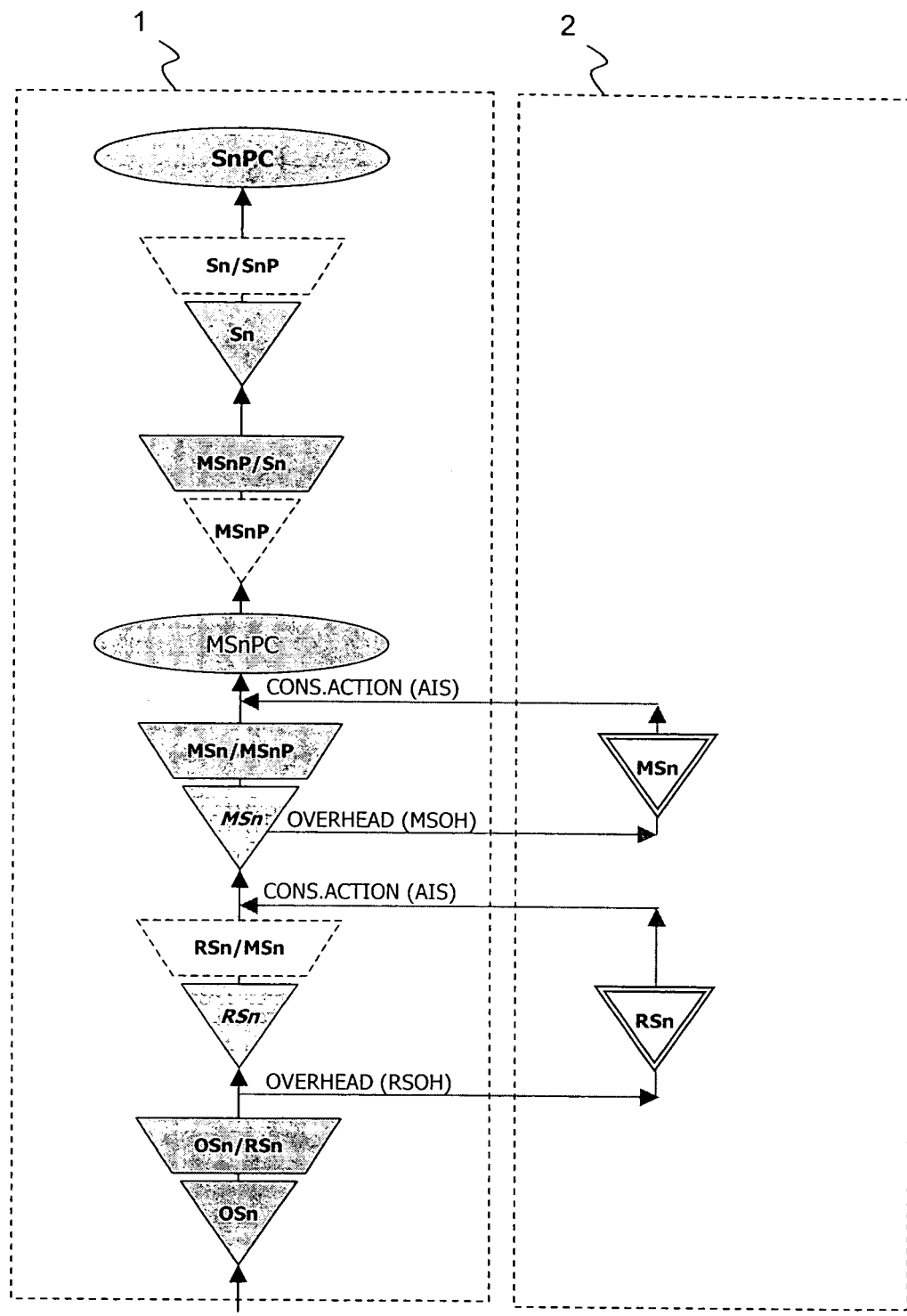
FIG. 4 shows a more detailed scheme of the partitioning according to a first embodiment of the present invention, implemented by two separate hardware modules.

In FIG. 4 a first embodiment of the present invention is shown. In particular, a single layer overhead extraction is shown. The overhead is extracted from the first hardware module (typically ASIC implemented) before regenerator section (RSn) and fed to a separate second hardware module (typically FPGA implemented) for carrying out regeneration. The first and second module cooperate one each other as the detection of alarms or the like are communicated to the first module for taking consequent actions. In the second hardware module multiplex section operations are also carried out on the extracted overhead. Any detected failure (AIS) or the like is communicated to the first hardware module for taking proper actions. Adaptation and cross-connection functions act on payload and are not extracted from the first module.

Figure 5:
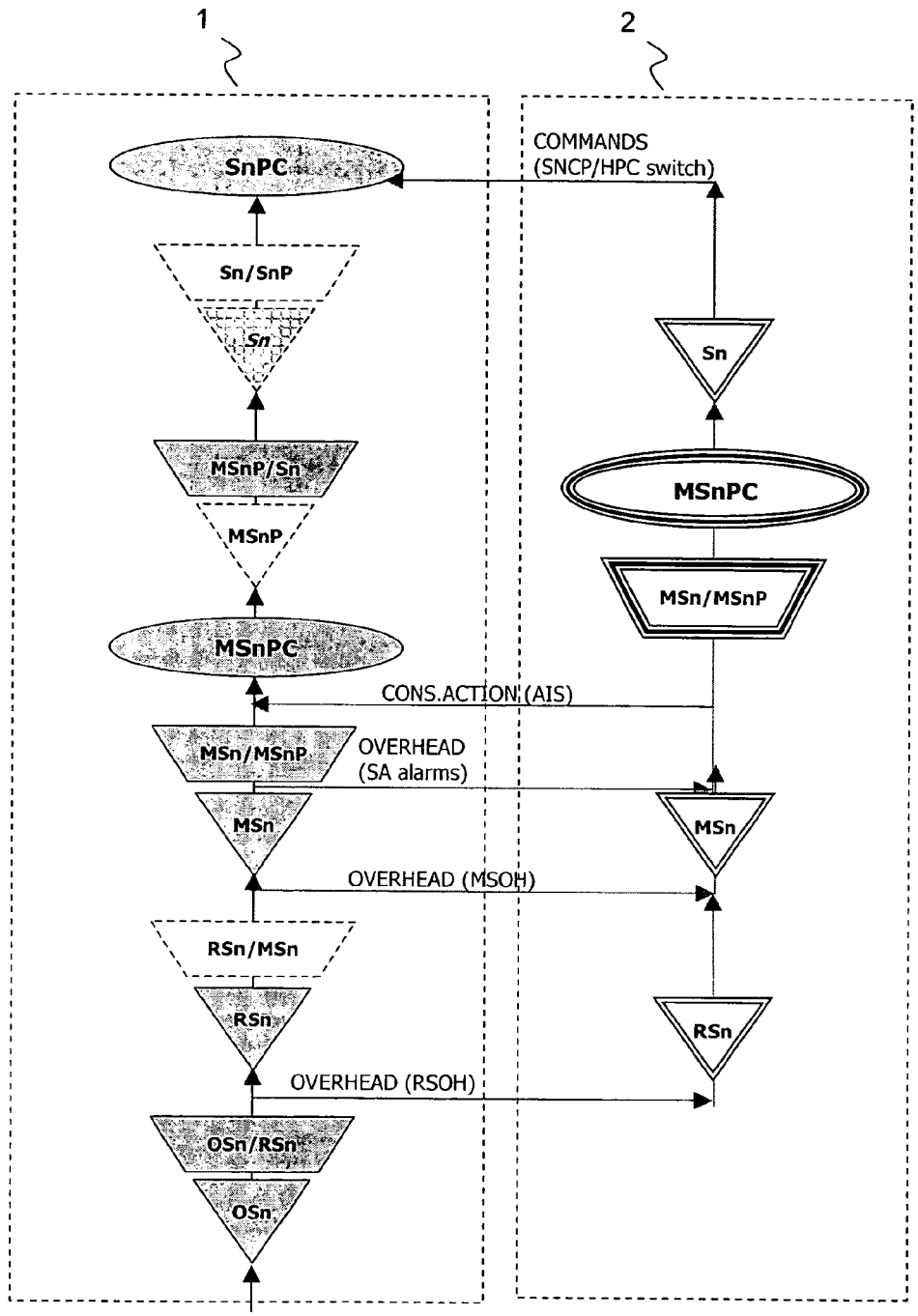
FIG. 5 shows a more detailed scheme of the partitioning according to a second embodiment of the present invention, implemented by two separate hardware modules

In FIG. 5, a multiple layer overhead extraction/elaboration is schematically shown. Indeed, the overhead elaboration crosses more than one layer. Again, only sink functions are depicted. In FIG. 5, the degenerate functions are sketched in white with broken outline, the extracted functions are in white with dual outline and the emulated functions are in white with triple outline. Adaptation and cross-connection functions act on payload and are not extracted from the first module. Adaptation and cross-connection functions should be emulated for overhead.

The solution according to the present invention provides outstanding advantages on standard evolution compatibility, risk mitigation, and time to market. Moreover, as standard functionalities on the payload are often trivial, the split between payload and overhead usually allows to collapse payload matrices, allowing outstanding performances in terms of equipment density.

Finally, the early split of payload and overhead allows to implement overhead function on line cards, distributing the computation among many cards and not concentrating it on a very complex matrix board.

It will be realized that the cost for providing a FPGA device in addition to the ASIC is negligible when compared with the cost of the entire system and when the advantage of having one system development that follows feature/standards evolution is taken into account. From a commercial point of view, through the arrangement according to the present invention, the first market window for the early product release can be gained. Moreover, when cost reduction is needed and flexibility is no more an advantage (generally at later stages of product life), FPGAs can be promptly converted in low-cost ASIC technology.

There have thus been shown and described a novel device and a novel method which fulfil all the objects and advantages sought therefore. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the scope of the invention are deemed to be covered by the invention which is limited only by the claims which follow.

We claim:

1. A device for processing a telecommunications frame which includes overhead and payload, the device comprising:
    a first hardware module for processing the payload, wherein the payload processing comprises adaptation, termination and cross-connection functions; and
    a second hardware module for processing at least a part of the overhead,
    wherein said second hardware module cooperates with the first hardware module
    and receives the overhead extracted by the first hardware module before a regenerator section,
    wherein the processing of at least a part of the overhead performed by the second hardware module comprises:
        buffering the overhead on single significant byte basis;
        determining at least one single tributary;
        elaborating such a buffered overhead on standard compliance for the at least one single tributary for defect process and correlation process;
        calculating output consequent actions and protection commands, according to different protection schemes; and
        performing overhead regeneration,
    wherein said second hardware module communicates any detected failure to the first hardware module for taking possible consequent actions, and
    wherein said second hardware module controls the cross connection function.

2. The device according to claim 1, wherein said second hardware module performs one or more of overhead adaptation and termination functions.

3. The device according to claim 1, wherein the first hardware module comprises an application-specific integrated circuit.

4. The device according to claim 3, wherein the second hardware module comprises a field programmable gate array.

5. A telecommunication network element comprising a device according to claim 1.

6. The device according to claim 1, wherein said second hardware module carries out a plurality of overhead section operations.

7. A method for processing a telecommunications frame including overhead and payload, the method comprising:
    processing the payload by a first hardware module, the payload processing comprising adaptation, termination and cross-connection; and
    processing at least a part of overhead by a second separate hardware module,
    wherein said second hardware module cooperates with the first hardware module and receives the overhead extracted by the first hardware module before a regenerator section and carries out overhead regeneration, communicates any detected failure to the first hardware module for taking possible consequent actions, and controls the payload cross connection, and
    wherein the processing of at least a part of the overhead performed by the second hardware module includes an overhead synchronization method, the method comprising:
        buffering the overhead on single significant byte basis and for each single tributary;
        elaborating such a buffered overhead on standard compliance, for defect process and correlation process; and
        calculating output consequent actions and protection commands, according to different protection schemes.

8. The method according to claim 7, wherein the step of processing at least a part of overhead by said second hardware module comprises performing one or more of overhead adaptation and termination functions.

9. The method according to claim 7, wherein the first hardware module comprises an application-specific integrated circuit.

10. The method according to any of claim 9, wherein the second hardware module comprises a field programmable gate array.

11. The method according to claim 7, wherein said second hardware module carries out a plurality of overhead section operations.

* * * * *